United States Patent [19]

Wills

[11] Patent Number: 4,706,180

[45] Date of Patent: Nov. 10, 1987

[54] PULSE WIDTH MODULATED INVERTER SYSTEM FOR DRIVING SINGLE PHASE A-C INDUCTION MOTOR

[75] Inventor: Frank E. Wills, York, Pa.

[73] Assignee: York International Corporation, York, Pa.

[21] Appl. No.: 803,028

[22] Filed: Nov. 29, 1985

[51] Int. Cl.[4] .............................................. H02M 7/538
[52] U.S. Cl. ....................................... 363/132; 363/98; 363/41
[58] Field of Search ................... 363/41, 98, 131, 132; 318/801, 811

[56] References Cited

U.S. PATENT DOCUMENTS

| | | | |
|---|---|---|---|
| 3,875,483 | 4/1975 | Farr | 318/213 |
| 4,024,444 | 5/1977 | Dewan et al. | 318/227 |
| 4,330,817 | 5/1982 | Avar et al. | 363/96 |
| 4,409,534 | 10/1983 | Bose | 318/811 |
| 4,419,615 | 12/1983 | Muto et al. | 318/811 |
| 4,445,167 | 4/1984 | Okado | 363/56 |
| 4,447,786 | 5/1984 | Saar et al. | 318/811 |
| 4,519,022 | 5/1985 | Glennon | 363/132 |
| 4,591,964 | 5/1986 | Kemstedt | 363/24 |

*Primary Examiner*—Patrick R. Salce
*Assistant Examiner*—Judson H. Jones
*Attorney, Agent, or Firm*—Finnegan, Henderson, Farabow, Garrett & Dunner

[57] ABSTRACT

A substantially perfect single phase sinusoidal shaped voltage waveform may be generated for driving a single phase a-c induction motor by employing a sinusoidally weighted pulse width modulated signal to switch a pair of solid state power switches on and off in alternation in order to connect the motor alternately across positive and negative power supplies. A low pass filter is effectively connected in series with the single phase motor to filter out all of the signal components except the fundamental of the sine wave modulating frequency. In this way, only a sinusoidal voltage is applied to the motor. By making the switching frequency very high relative to the sine wave modulation component, the filter size and cost are minimized and it is unnecessary to correlate or synchronize the sine wave modulation and switching frequencies.

12 Claims, 2 Drawing Figures

PULSE WIDTH MODULATED INVERTER SYSTEM FOR DRIVING SINGLE PHASE A-C INDUCTION MOTOR

BACKGROUND OF THE INVENTION

This invention relates to a simplified inverter system for driving an a-c induction motor. More particularly, the invention relates to a highly efficient pulse width modulated inverter system for supplying single phase sinusoidal shaped voltage to a single phase a-c induction motor.

Speed control of single phase a-c induction motors has generally been accomplished by merely reducing the amplitude of the applied motor voltage. This decreases the motor's torque output and causes certain types of loads, such as fans, to operate at a slower speed. The penalty for this mode of operation is reduced motor efficiency due to "high slip" operation. Losses are often so high that special requirements are placed on rotor resistance and cooling methods.

Quasi-square wave (QSW) inverters, wherein the output alternating voltage is adjustable in both magnitude and frequency, are usually not used on single phase motors for two reasons. In the first place, since the inverter produces some form of square wave, a highly distorted current waveform, having substantial harmonic content, would result, causing excessive power losses in both the inverter and the motor, excessive motor heating and noisy (hum) motor operation. The second reason has been the high cost of providing such a controlled QSW inverter for a single phase motor.

The present invention alleviates both of these obstacles by providing a relatively simple, and inexpensive, pulse width modulated (PWM) inverter system that generates genuinely sinusoidal single phase voltage and current waveforms while maintaining high efficiency in the inverter and motor.

SUMMARY OF THE INVENTION

The pulse width modulated inverter system of the invention supplies single phase a-c power to a single phase a-c induction motor and comprises a positive power supply for providing a positive d-c voltage of fixed magnitude, and a negative power supply for providing a negative d-c voltage of the same fixed magnitude. A low pass filter has an inductance coil, connected in series with the motor, and a capacitor connected in parallel with the motor. There are means, including a first solid state power switch, for coupling the motor and low pass filter across the positive power supply and means, including a second solid state power switch, for coupling the motor and low pass filter across the negative power supply. Means are provided for developing a sinusoidally weighted pulse width modulated switching signal. Means, responsive to the switching signal, turns the power switches on in alternation in order to couple the motor and low pass filter alternately to the positive and negative power supplies. With this arrangement, the low pass filter filters out all signal components except the fundamental of the sine wave modulating frequency, thereby to apply to the motor only a sinusoidal voltage at the fundamental frequency.

DESCRIPTION OF THE DRAWINGS

The features of the invention which are believed to be novel are set forth with particularity in the appended claims. The invention may best be understood, however, by reference to the following description in conjunction with the accompanying drawings in which:

DESCRIPTION OF THE ILLUSTRATED EMBODIMENT

Figure 1:
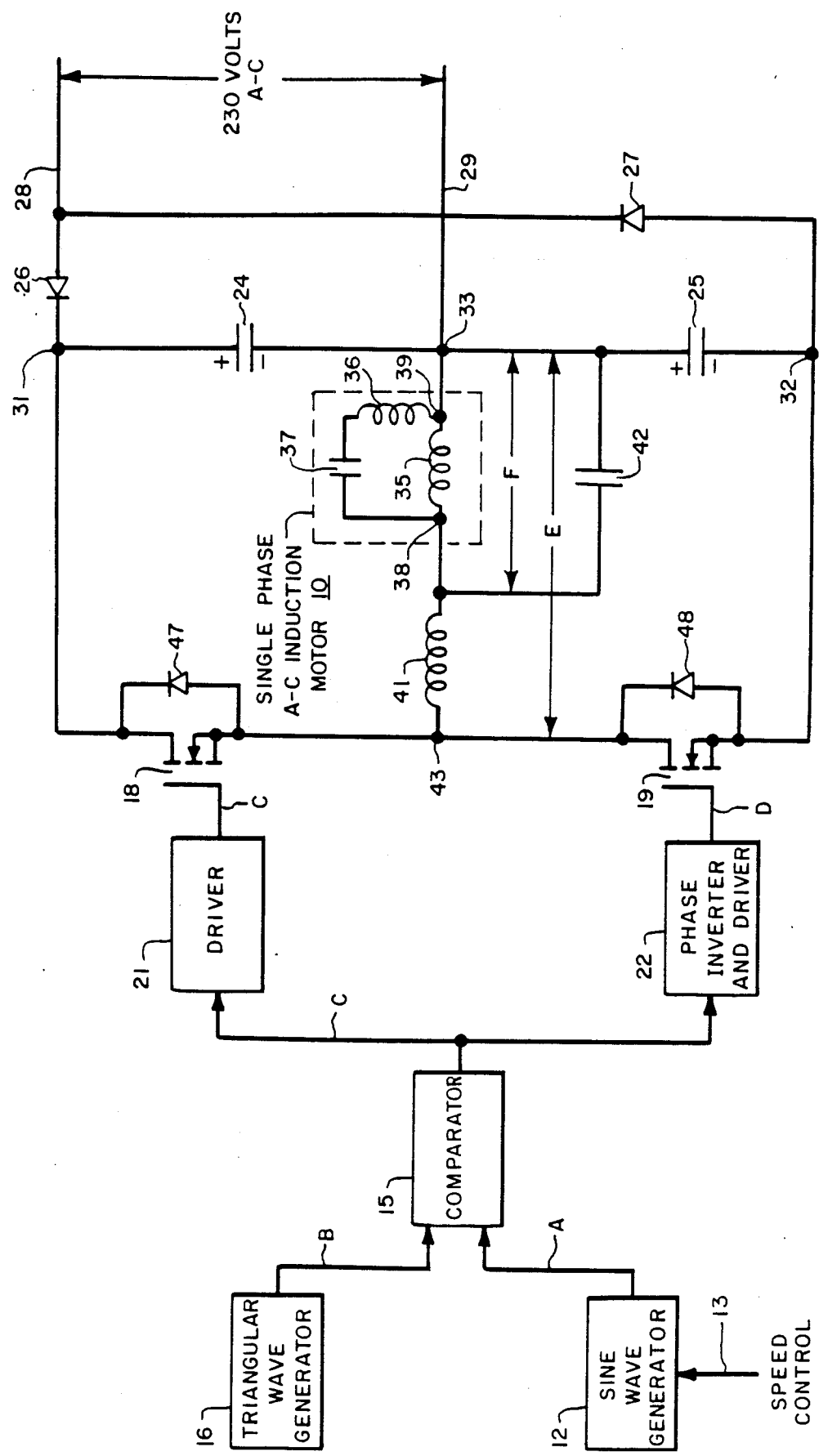
FIG. 1 schematically illustrates a pulse width modulated inverter system, constructed in accordance with the invention, and the manner in which that inverter system is coupled to a single phase a-c induction motor to apply thereto sinusoidal voltage and current waveforms.

Referring to FIG. 1, variable frequency and amplitude, single phase a-c power will be supplied to single phase a-c induction motor 10 and the frequency and amplitude of that power will be determined by the output of sine wave generator or oscillator 12. The generator has a "speed control" input 13 over which a control signal may be delivered to adjust the generator's frequency and output voltage, thereby to contol the speed of motor 10. The control signal may be derived by sensing some parameter or characteristic of the system, in which the inverter-motor system is incorporated, in order to automatically control the motor speed in response to that sensed information. On the other hand, control of the frequency and amplitude of the sinusoidal voltage produced by generator 12 may be effected merely by means of an appropriate manually adjustable control, such as a potentiometer, in generator 12. Preferably, the motor will be operated over a frequency or speed range from about 12 to 60 hertz and the motor voltage will be adjusted to vary in direct proportion to the frequency so that the ratio of the motor voltage to frequency will always remain the same. A constant amplitude-frequency ratio is particularly desirable, when driving a motor, for a variety of reasons, such as to avoid overheating of the motor and to provide the motor with a constant torque output capability regardless of motor speed. Such a constant ratio of the amplitude of the motor voltage relative to the voltage's frequency may be obtained by appropriately varying the sinusoidal output voltage developed by generator 12 when the frequency is changed in response to a control signal on input 13, or in response to a manual adjustment of the generator. In other words, as the frequency of the sine wave increases, the output voltage should do likewise, and vice versa when there is a frequency decrease.

Figure 2:
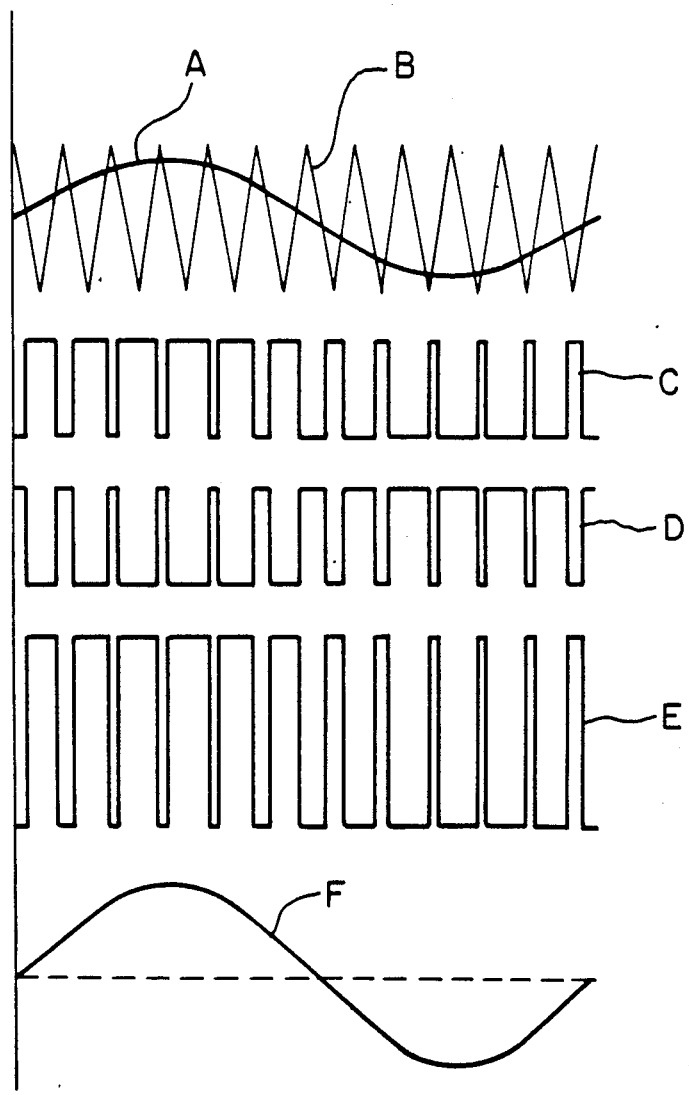
FIG. 2 depicts various voltage waveforms that appear in the inverter-motor system and will be helpful in understanding the operation of the invention.

The sinusoidal voltage produced by generator 12, and applied to one input of differential comparator 15, is depicted by voltage waveform A in FIG. 2. The other input of comparator 15 receives the output voltage (waveform B) from triangular wave generator 16. For illustrative purposes, the frequency of the triangular wave B is only twelve times the frequency of the sine wave A, but in practice the triangular shaped signal would have a fixed frequency of at least 10 kilohertz for reasons to be explained. When the sine wave and triangular wave intercept one another (namely are equal in amplitude), comparator 15 switches operating states between its high and low levels, as a result of which the comparator produces a sinusoidally weighted pulse width modulated switching signal (waveform C) having a switching frequency component equal to the fixed frequency of the triangular wave B and a sine wave modulation component equal to the adjustable frequency of sine wave A. The arrangement of circuits 12, 15 and 16 to produce the sinusoidally weighted pulse width modulated switching signal of waveform C is, of course, well known. It is particularly attractive in that it may be implemented with inexpensive low voltage logic circuits.

By observing waveforms A, B and C it is apparent that during each of the twelve cycles of the triangular wave B, a single positive-going pulse appears in the switching signal of waveform C and the duty cycle of that single pulse (namely, the width or duration of the pulse relative to the period or duration of the complete cycle) is determined by the instantaneous amplitude of the sine wave of waveform A. Specifically, the area of each positive-going pulse in the switching signal represents the amplitude of the sine wave at that instant. During each successive cycle of the triangular wave, the duty cycles change slightly since the instantaneous amplitude of the sine wave is changing. If the RMS (root mean square) amplitude of the sine wave is then varied, the duty cycle of each positive-going pulse will also change. On the other hand, if the frequency of the sine wave changes, the duty cycles will also change. In addition, the rate at which the duty cycles change from one switching interval (namely, from cne cycle of the triangular wave) to the next will be varied.

The sinusoidally weighted pulse width modulated switching signal of waveform C is employed to turn a pair of solid state power switches 18 and 19 on and off in alternation (namely, one being on while the other is off and vice versa) to connect the motor 10 alternately across positive and negative high d-c voltage (compared to the low d-c voltage needed in the logic circuits) power supplies. More particularly, each of power switches 18 and 19 is preferably a field effect transistor, specifically a MOSFET, having source, drain and gate terminals. Since field effect transistor have high switching speeds they can be operated at high switching frequencies. The switching signal of waveform C is applied via driver 21 and in phase to the gate of power switch 18, whereas the switching signal is applied via phase inverter/driver 22 in phase opposition (180° out of phase), as shown by waveform D, to the gate of power switch 19. Each power switch is gated on in response to a positive-going pulse applied to its gate. Hence, whenever a positive-going pulse of waveform C turns switch 18 on, switch 19 will be off, and conversely whenever a positive-going pulse of waveform D renders switch 19 conductive, switch 18 will be non-conductive.

The positive and negative power supplies are provided by capacitors 24 and 25 and rectifier diodes 26 and 27. A-C power line voltage, such as 230 volts A-C, is received over line conductors 28 and 29 and is rectified by diodes 26 and 27 to charge capacitors 24 and 25 with the polarity indicated in the drawing. To elaborate, during each positive half cycle of the applied 230 volts A-C when the voltage on conductor 28 is positive relative to that on conductor 29, current flows through diode 26 to charge capacitor 24. During the alternate negative half cycles when the voltage on conductor 29 is positive with respect to the voltage on conductor 28, current flows to capacitor 25 and through diode 27. By appropriately matching the circuit elements, the d-c voltages across capacitors 24 and 25 will be equal in magnitude but opposite in polarity. Thus, capacitors 24 and 25 constitute a balanced d-c voltage source having a positive terminal 31, a negative terminal 32 and a neutral terminal 33 which is connected to conductor 29. A positive power supply is provided between positive terminal 31 and neutral terminal 33, while a negative power supply exists between terminals 32 and 33.

Single phase a-c induction motor 10 is of conventional construction and is of the permanent split capacitance type having, in delta connection, a pair of field windings 35 and 36 and a phase shift capacitor 37. When a-c voltage is applied to the motor terminals 38 and 39, and thus across winding 35, the voltage will be phase shifted almost 90° by capacitor 37 for application to winding 36. This is necessary to effect motor rotation.

A low pass filter, comprising inductance coil 41 and capacitor 42, is effectively coupled in series with motor 10. Specifically, coil 41 is connected between motor terminal 38 and circuit junction 43 which connects to the source terminal of power switch 18 and to the drain terminal of power switch 19. Capacitor 42 is shunt connected across motor 10.

In operation of the inverter-motor system, each time power switch 18 is switched on, namely during each positive-going pulse of waveform C (at which time switch 19 will be off), the positive d-c voltage at terminal 31 will be applied to circuit junction 43 and thus across the series arrangement comprising filter 41, 42 and motor 10. On the other hand, each time power switch 19 is gated on by a positive-going pulse of waveform D, the negative d-c voltage at terminal 32 will be applied to terminal 43 and across the filter-motor circuit. As a result, voltage waveform E will appear between terminal 43 and neutral terminal 33 and thus across filter 41, 42 and motor 10. Since the switching frequency is so high (at least 10 kilohertz as mentioned), relatively inexpensive and small filter elements 41, 42 may be employed to remove from the signal of waveform E all signal components except the fundamental of the sine wave modulating frequency. The higher the ratio of the switching frequency to the sine wave modulating frequency, the higher will be the frequencies of the unwanted harmonics in waveform E and the easier may those harmonics be filtered out by low pass filter 41, 42. The greater the frequency separation between the modulating and switching frequencies, the simpler it is to eliminate the sidebands of the switching signal component. In other words, due to the wide separation of the wanted frequency component and the unwanted components, the inverter output (waveform E) can easily be filtered to give a pure sinusoidal output voltage waveform. Because of the high switching frequency used, all harmonics of any significance are of such a frequency that filtering can be accomplished with small and inexpensive circuit elements.

Moreover, since the switching frequency is so high relative to the modulating frequency, it is not necessary to correlate or synchronize the modulating and switching frequencies. Usually, the switching frequency is an integer multiple of the modulating frequency to avoid beat frequencies, and when the modulating frequency is changed, the switching frequency is also usually varied to maintain that desired relationship so that beat frequencies are not created. With the high switching frequency in the present invention any beat frequencies are easily removed by filter 41, 42 so there is no need to have a switching frequency that is an integer multiple of the modulating frequency. As a consequence, the modulating frequency may be adjusted throughout its range (which is preferably from 12 to 60 hertz as mentioned)

and the switching frequency, namely the frequency of the triangular wave produced by generator 16, may remain constant. This simplifies the construction of generator 16. In addition, such a fixed frequency allows the use of a resonant filter tuned to the switching frequency.

Since low pass filter 41, 42 removes all of the unwanted signal components in waveform E, only the perfect sinusoidal voltage shown by waveform F will be applied to the motor terminals 38 and 39 and thus will appear between terminal 38 and neutral terminal 33. This sine wave voltage is, of course, identical to and is an exact simulation of the basic sine wave of waveform A. A highly efficient system is therefore provided. Genuinely sinusoidal, single phase voltage and current waveforms are produced in motor 10, while producing no motor performance degradation, namely minimum power losses, motor heating and motor noise.

Diodes 47 and 48, which shunt power switches 18 and 19, respectively, function to provide a path for the flow of reactive energy.

It is thus apparent that the invention provides a unique and simplified inverter system for operating a single phase a-c induction motor at a variable speed in a very efficient manner. In short, this is achieved by alternately connecting positive and negative power supplies to the motor in response to opposed phases of a sinusoidally weighted pulse width modulated signal. A low pass filter ensures that only a sinusoidal voltage, having a frequency equal to the fundamental of the sine wave modulating frequency, will be applied across the motor.

It should also be appreciated that the inverter system of the invention can easily be connected in an existing installation, with no modification of the single phase induction motor, to achieve variable speed operation. When a-c power line voltage is applied directly to a single phase induction motor to effect motor rotation at a constant speed, the inverter system can be effectively interposed between the source of power line voltage and the motor to facilitate adjustment of the motor speed.

While a particular embodiment of the invention has been shown and described, modifications may be made, and it is intended in the appended claims to cover all such modifications as may fall within the true spirit and scope of the invention.

I claim:

1. A pulse width modulated inverter system for supplying single phase a-c power to a single phase a-c induction motor, comprising:

a positive power supply for providing a positive d-c voltage of fixed magnitude;

a negative power supply for providing a negative d-c voltage of the same fixed magnitude;

means for developing a sinusoidally weighted pulse width modulated switching signal having a high switching frequency and a single phase sine wave modulation component representative of the desired a-c signal to be applied to the motor, the switching frequency of said switching signal being very high relative to that of the sine wave modulation component;

a low pass filter having an inductance coil, connected in series with the motor, and a capacitor, connected in parallel with the motor, said low pass filter having the capability of filtering out high frequency signal components associated with the switching signal and passing along those components associated with the sine wave modulated component of the switching signal;

means, including a first solid state power switch, for coupling the motor and low pass filter across the positive power supply;

means, including a second solid state power switch, for coupling the motor and low pass filter across the nagative power supply; and means, coupled with means for developing a switching signal and responsive to said switching signal, for turning said power switch means on in alternation in order to couple the motor and low pass filter alternately to the positive and negative power supplies, said low pass filter filtering out all signal components except those associated with the sine wave modulation conponent of the switching signal, thereby applying to the motor single phase sinusoidal voltage having a frequency equal to the frequency of the sine wave modulation component of the switching signal.

2. A pulse width modulated inverter system according to claim 1 wherein said means for developing a switching signal can vary the sine wave modulation component of said switching signal in order to vary the frequency of the sinusoidal voltage applied to the motor and thereby control the motor speed.

3. A pulse with modulated inverter system for supplying single phase a-c power to a single phase a-c induction motor, comprising:

a balanced d-c voltage source having positive, negative and neutral terminals, a positive power supply thereby being provided between the positive and neutral terminals while a negative power supply is provided between the negative and neutral terminals;

means for developing a sinusoidally weighted pulse width modulated switching signal having a high switching frequency and a single phase sine wave modulation component representative of the desired a-c signal to be applied to the motor, the switching frequency of said signal being very high relative to that of the sine wave modulation component;

a low pass filter including an inductance coil, connected in series with the motor, and a capacitor, connected in parallel with the motor, said low pass filter having the capability of filtering out high frequency signal components associated with the switching signal and passing along those components associated with the sine wave modulated component of the switching signal;

means, including a first solid state power switch, for coupling the motor and low pass filter across the positive power supply;

means, including a second solid state power switch, for coupling the motor and low pass filter across the negative power supply; and means, coupled with said means for developing a switching signal and responsive to said switching signal, for applying opposed phases of said switching signal to said first and second power switches to render the switches conductive in alternation in order to couple the motor and loss pass filter alternately to the positive and negative power supplies, said low pass filter filtering out all signal components except those associated with the sine wave modulation component of the switching signal, thereby applying to the motor a single phase sinusoidal voltage having a frequency equal to the frequency of the sine wave modulation component of the switch signal.

4. A pulse width modulated inverter system according to claim 3 wherein said means for developing a switching signal can vary the sine wave modulation component of said switching signal in order to vary the frequency of the sinusoidal voltage applied to the motor and thereby control the motor speed.

5. A pulse width modulated inverter system according to claim 3 wherein each of said solid state power switches is a field effect transistor.

6. A pulse width modulated inverter system according to claim 3 wherein each of said solid state power switches is a field effect transistor having source, drain and gate terminals, wherein one of the motor terminals is connected directly to said neutral terminal while the other motor terminal is connected through said inductance coil to the source terminal of said first power switch and to the drain terminal of said second power switch, said switching signal being applied to the gate terminals of said power switches.

7. A pulse width modulated inverter system according to claim 3 wherein the motor is of the permanent split capacitance type having, in delta connection, first and second field windings and a phase shift capacitor, the motor terminals being connected to the terminals of the first field winding so that the applied sinusoidal motor voltage appears across the first winding in phase and across the second winding almost 90° phase shifted, one of the motor terminals being connected directly to said neutral terminal while the other motor terminal is connected through said inductance coil to a circuit junction between said first and second power switches.

8. A pulse width modulated inverter system according to claim 3 wherein said low pass filter is a resonant filter which is tuned into the switching frequency of said switching signal.

9. A pulse width modulated inverter system for supplying a variable, single phase a-c power to a single phase a-c inductor motor, comprising:
   a positive power supply for providing a positive d-c voltage of fixed magnitude;
   a negative power supply for providing a negative d-c voltage of the same fixed magnitude;
   a sine wave generator means for producing a single phase sine wave control signal having a frequency and amplitude representative of the desired speed of the a-c induction motor, the generator means being capable of selectively varying the amplitude and frequency of the control signal as desired;
   a triangular wave generator means for producing a triangular shaped signal having a frequency which is very high relative to the frequency of the control signal;
   a comparator means coupled with said sine wave generator means and said triangular wave generator means for producing a sinusoidally weighted pulse width modulated switching signal having a high switching frequency equal to the frequency of the triangular shaped signal and a single phase sine wave modulation component representative of the frequency and amplitude of the control signal;
   a low pass filter having an inductance coil, connected in series with the motor, and a capacitor, connected in parallel with the motor, said low pass filter having the capability of filtering out high frequency signal components associated with the switching signal and passing along those components associated with the sine wave modulation component of the switching signal;
   means, including a first solid state power switch, for coupling the motor and low pass filter across the positive power supply;
   means, including a second solid state power switch, for coupling the motor and low pass filter across the negative power supply; and
   means, coupled with said comparator means and responsive to said switching signal, for turning said power switches on in alternation in order to couple the motor and low pass filter alternately to the positive and negative power switches,
   said low pass filter filtering out all signal components except those associated with the sine wave modulation component of the switching signal, thereby applying to the motor a single phase sinusoidal voltage having a frequency equal to the frequency of the control signal.

10. A pulse width modulated inverter system according to claim 9 wherein said sine wave generator means produces a control signal having a frequency within the range of 12 to 60 hertz and having an amplitude-to-frequency ratio which is constant.

11. The pulse width modulated inverter system according to claim 10 wherein said triangular wave generator means produces a triangular wave having a constant frequency of at least 10 kilohertz.

12. A pulses with modulated inverter system according to claim 11 wherein said low pass filter is a resonant filter which is tuned into the switch frequency of said switching signal.

* * * * *